Jan. 16, 1951 W. F. RAFFKE 2,538,629
TOOL LIFTER
Filed Dec. 23, 1946 2 Sheets-Sheet 1

INVENTOR.
WILLIAM F. RAFFKE,
BY Allen & Allen
ATTORNEYS.

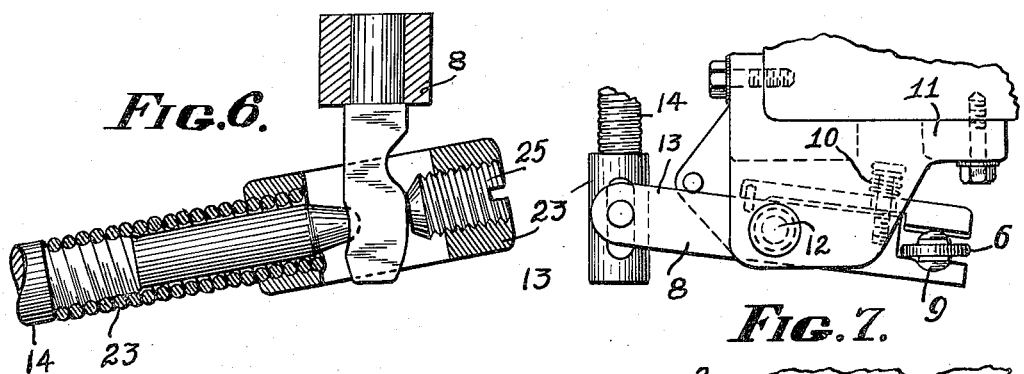
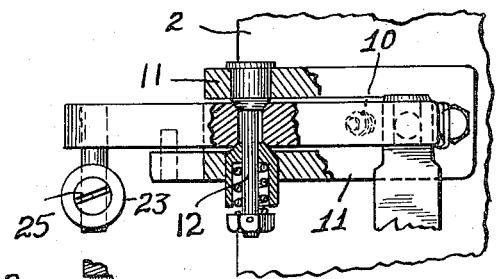
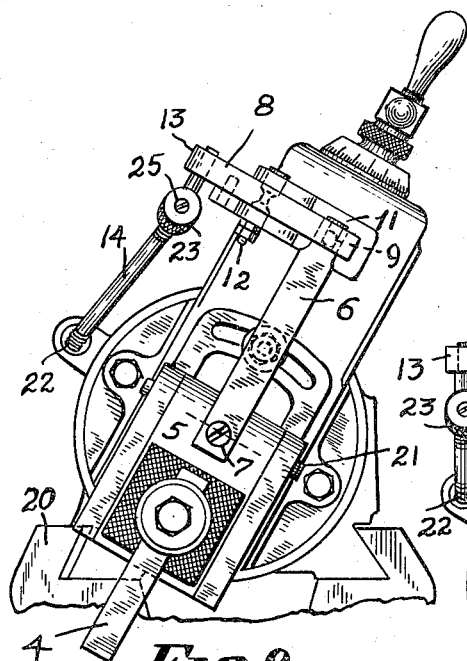
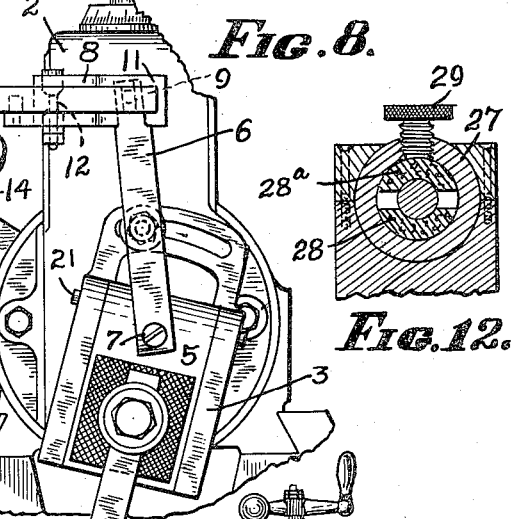
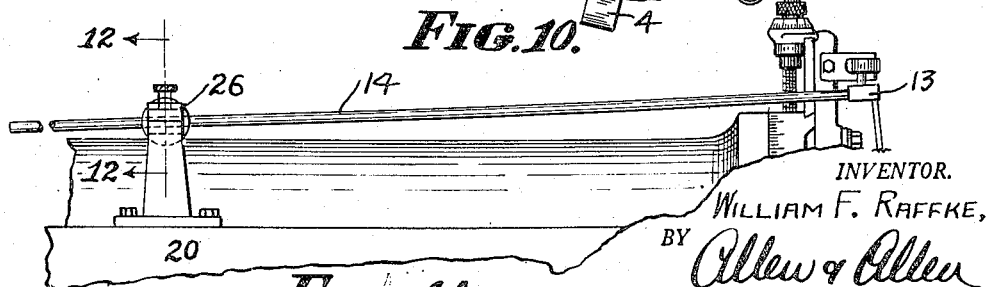

Patented Jan. 16, 1951

2,538,629

UNITED STATES PATENT OFFICE 2,538,629

TOOL LIFTER

William F. Raffke, Silverton, Ohio, assignor to The Cincinnati Shaper Company, Cincinnati, Ohio, a corporation of Ohio Application December 23, 1946, Serial No. 717,920

6 Claims. (Cl. 90—55)

My invention relates to a tool lifter for lifting the tool on its return or traverse stroke in any machine tool having a tool carrying clapper box with the tool mounted on the clapper.

My invention particularly relates to a tool lifter for use with a shaper wherein the reciprocating heat at times moves at various rates from a few to several hundred strokes per minute, and wherein the clapper carrying the tool is apt to remain out of tool cutting position on the cutting stroke due to the inertia created by the high speed movement of the head.

It is an object of my invention to provide a simple mechanically actuated tool lifter which acts as a clapper restrainer at high speeds and insures the lifting of the clapper on the return or traverse stroke to such an extent that the tool will be out of contact with the work and will not scratch or mar the same. Another prime object is to prevent damage to the cutting tool or tools by preventing contact with the work on the return or traverse stroke.

It is a further object of my invention to provide a tool lifter as described above which may be quickly and easily disengaged from the clapper so as to be completely out of the way of the actuation of the machine when the tool lifter is not desired.

It is a further object of my invention to provide such a tool lifter as described above which when in operation will not interfere with the adjustment of the head of the machine in reference to position or depth of cut, or feed, and which will operate satisfactorily at all times, no matter in what position the head, slide, clapper, ram and/or cutting tool of the machine are set, in reference to the remaining portions of the machine, within the practical range of adjustments.

These and other objects of my invention which will be set forth hereinafter or which will be apparent to one skilled in the art upon reading these specifications, I accomplish by that certain construction and arrangement of parts of which I shall now describe an exemplary embodiment. Reference is now made to the drawings which form a part thereof, and in which:

Figure 6 is a section of the coupling between the drag rod and the rocker arm which is a part of my invention taken on the section line 6—6 of Figure 3.

Figure 7 is a plan view of the rocker arm which forms a part of my invention and which is also shown on small scale in Figure 3.

Figure 8 is a front elevation of the rocker arm shown in Figure 7 with a portion cut away to show the pivot construction.

Figure 9 is an end view of a typical tool carrying head similar to that shown in Figure 2 but in a different position.

Figure 10 is a partial end elevation of the tool heads shown in Figures 2 and 9 with the clapper box positioned differently.

Figure 11 is a partial side elevation of a typical shaper showing a modified tool lifter.

Figure 12 is a cross section showing the integral journal construction in Figure 11 and is taken on the section line 12—12 thereof.

Figure 1:
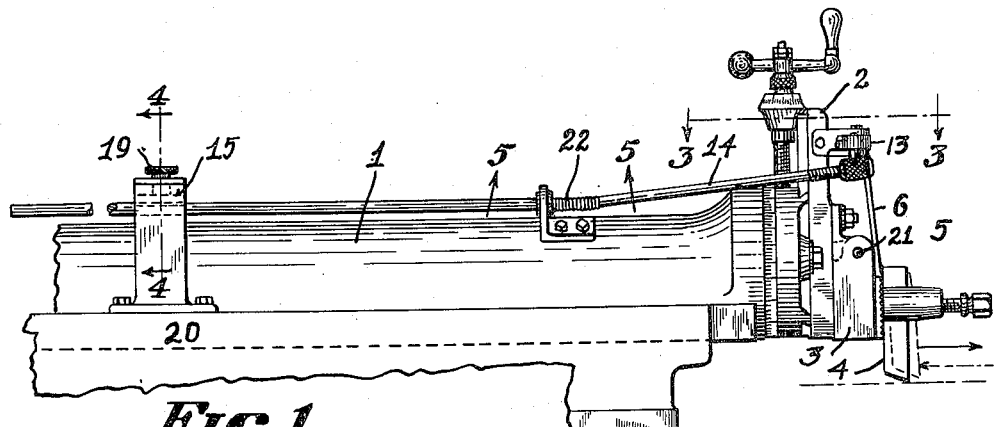
Figure 1 is a side elevation of a typical shaper showing my novel tool lifter in place and in operative position.

While in the drawings and in the following description I will describe my invention as used with a shaper, it should be understood that I do not intend to limit myself to this specific machine, since my tool lifter may be used with any reciprocating tool machine wherein the tool is mounted on a clapper box.

Briefly, in the practice of my invention, I provide an arm or lever attached to the clapper of the clapper box which carries the cutting tool. The end of this lever is attached to a rocker arm fastened to the tool carrying head. The other end of the rocker arm is flexibly attached to a drag rod or drag link which runs through a frictional, adjustable journal on an immovable portion of the machine.

In operation, the reciprocation of the tool head carrying the clapper box pulls the drag rod through the journal, and the friction of the journal on the rod places sufficient drag through the rocker arm onto the lever attached to the clapper to move the same sufficiently to lift the tool from the work on the traverse or return stroke and insure the dropping of the clapper to its full tool cutting position on the cutting stroke.

Referring to the drawings, the reciprocating portion of a typical shaper 1 carries a typical adjustable head 2, on which is mounted the clapper box 3 with the tool 4 mounted on the clapper 5.

In normal operation of a typical shaper, the cutting stroke of the machine will be to the right in Figure 1 and the clapper 5 will remain in its tool cutting position with the tool 4 downwardly, as shown in Figure 1. When the tool carrying head 2 traverses or returns to the left in Figure 1, the tool 4 rides up on the work, lifting the clapper 5, in normal operation.

Figure 2:
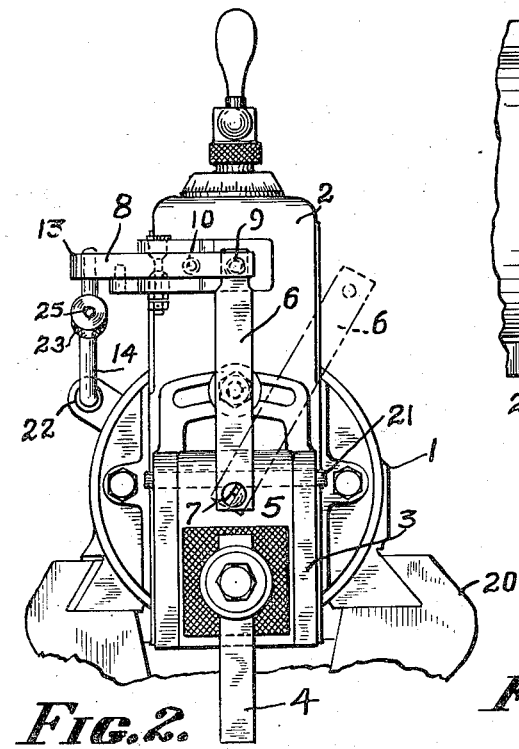
Figure 2 is an end elevation of a typical shaper showing my tool lifter in operative position.
Figure 3:
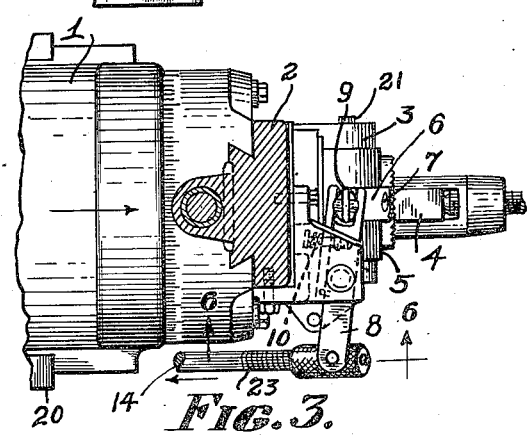
Figure 3 is a plan view of the head of a typical shaper showing my tool lifter in position.

My tool lifter consists of an arm rod or lever 6 pivotally attached to the clapper 5 at 7, by means of a bolt as clearly shown in Figure 2. The upper end of the lever 6 is connected to a rocker arm 8 (see Figure 7) which is preferably split, so as to resiliently hold the ball 9 at the terminal of the lever 6. In Figure 7, I have shown this split connection being resiliently urged together against the ball 9 by the spring 10.

The rocker arm 8 is mounted by means of a bracket 11 (see Figure 8) onto the tool head 2. The same being pivoted by means of the take-up pintle 12. By this construction, it should be noted that the rocker arm 8 may rock in a substantially horizontal plane, which in turn through the lever 6 will lift and lower the clapper 5.

Figure 4:
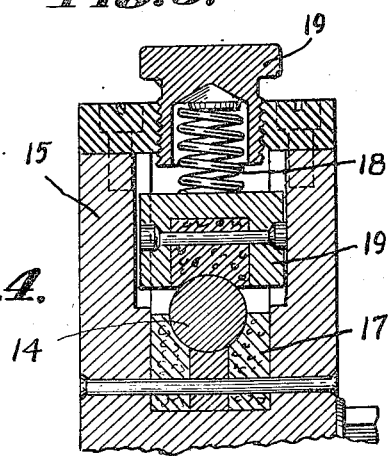
Figure 4 is a cross section of the frictional journal used in connection with my invention and taken on the section line 4—4 of Figure 1.

Flexibly attached to the opposite end 13 of the rocker arm 8 is a drag rod 14, which rides through a frictional journal 15, the bearings of which comprise two halves, 16 and 17, adjustably urged together on the rod 14 by means of the spring 18 and adjusting cup 19 (see Figure 4). The bracket 15 is mounted on an immovable portion 20 of the shaper.

From the above, it is apparent that when the shaper head 2 is moving to the right on its cutting stroke, it will drag the rod 14 through the journal 15. Due to the friction between the rod 14 and the journal 15, the end 13 of the rocker arm 8 will be resiliently held back, which in turn will rock the opposite end of the rocker arm 8 forwardly, which in turn through the lever 6 on the clapper 5 will tend to force the clapper downwardly, and maintain the tool 4 in cutting position.

On the return or traverse stroke just the reverse will happen. That is, the head 2 moving to the left will force the rod 14 through the friction journal 15. Due to the friction, there will be a resilient force exerted to the right by the rod 14. This will force the end 13 of the rocker arm 8 to the right which in turn will force the end of the lever 6 to the left and lift the clapper 5 on its pintle 21, and thus raise the tool 4 to the right and above the surface of the work.

Figure 5:
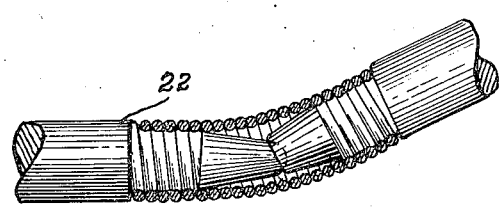
Figure 5 is a cross section of the universal joint used on the drag link or rod which is a part of my invention taken on the section line 5—5 of Figure 1.

In the drawings, I have shown a universal joint 22 incorporated in the rod 14, and I have also shown a flexible joint 23 between the end of the rod 14 and the end 13 of the rocker 8. These two joints as illustrated in Figures 5 and 6 permit the adjustment and movement of the head 2 in any of numerous positions, as exemplified by Figures 2 and 9 without in any way disturbing the dragging action of the journal 15 through the rod 14 and the rocker 8 and lever 6 to actuate the clapper 5.

The lever 6 is rotatably attached to the clapper 5 at 7 which permits the clapper box 3 to be adjusted through numerous positions, such as those shown in Figures 9 and 10.

The splitting of the rocker arm 8 so as to form a ball socket, grasping the ball 9 on the end of the lever 6, while permitting relative movement of the lever 6 and the rocker arm 8, also permits the withdrawal of the lever 6 from the end of the rocker arm 8 by merely manually moving it to the right, as shown by the broken lines in Figure 2. Thus, it is apparent that when the lever 6 is detached from the end of the rocker arm 8, as shown in the broken lines of Figure 2, the tool lifter is completely detached and inoperative, in its relation to the actuation of the clapper 5 and the tool 4 mounted thereon.

The frictional engagement of the journal 15 with the rod 14 may be adjusted by actuating the cup 19. The adjustment being tightened when the machine is running at a low speed and/or with a relatively heavy tool mounted on the clapper 5, or it may be lightened when the machine is running at high speed and/or the tool 4 is relatively light. To prevent the bearing of the rocker arm 8 from becoming loose, I have provided a self-aligning and tightening bearing 12, as shown in Figure 8. The adjustment as to the flexibility of the connection between the rocker arm 8 and the end of the rod 14 as well as means for disconnection is accomplished by actuation of the machine screw 25, as shown in Figure 6.

In Figures 11 and 12, I have shown my tool lifter wherein the rod 14 does not contain a universal joint as shown in Figure 5. In this case, the rod 14 runs straight and rigid from the end 13 of the rocker arm 8 directly through a journal 26 mounted on an immovable portion 20 of the machine. In this case, the journal 26 contains a spherical member 27 (see Figure 12) which may be revolved in any direction within the base portion of the journal 26. Within the spherical member 27, I provide bearing halves 28 and 28a urged together by a thumb nut 29. As is apparent, with the reciprocation of the head the straight rod 14 will reciprocate within the journal 26 and any change in direction will be taken care of by the movement of the spherical member 27 within the base portion of the journal 26.

The parts of the shaper itself, illustrated in the drawings, I have not described, since they are well known in the art and are of the typical form found on most shapers, and their specific configuration and adjustment has noting to do with the present invention. Due to the mechanical arrangement of the parts of my tool lifter, it is apparent that it is adaptable for use with any kind of tool machine wherein the tool is mounted on a clapper box and wherein the clapper box is reciprocated in relation to some other part of the machine. As an example, my device could be used on the typical planer wherein the journal 15 within which the rod 14 rides would be attached to the planer bed in such a manner as to actuate the clapper 5 in one direction on the tool cutting stroke and in the opposite direction to the traversing or return stroke.

It is apparent that my tool lifter is extremely simple and may be easily and quickly attached to any typical tool machine without the necessity of redesigning the machine or doing an extensive amount of construction. My tool lifter may be quickly and readily attached or made inoperative as described above by merely shifting the lever 6 out of engagement with the rocker arm 8. The lifting power may be easily varied as pointed out above by controlling the friction of the journal on the reciprocating rod 14.

It is to be understood that modifications may be made in my invention without departing from the spirit thereof, and I do not intend to limit myself otherwise than as pointed out in the claims which follow.

Having thus described my invention, what I claim as new and desire to secure by Letters Patent is:

1. In a shaping machine, planing machine or the like having a stationary portion and a reciprocating portion carrying an adjustable head on which is mounted a tool carrying clapper box, a tool lifter comprising a rocker arm mounted on the head and having a split end forming a resilient ball socket, a lever pivotally attached to the clapper and terminating in a ball removably retained within the ball socket of the rocker, a drag rod having its end removably and flexibly connected to the other end of the rocker arm and slidably positioned within a journal having a frictionally adjustable bearing mounted on said stationary portion, for the purpose described.

2. In a machine tool having a tool carrying clapper box mounted on a reciprocating head, a tool lifter comprising a lever mounted on the clapper and tiltable in a parallel plane therewith, a rod reciprocating with the head, a journal in which said rod is frictionally slidable mounted on a stationary portion of the machine, a rocker arm pivotally mounted on the head above the clapper box with its ends connected to said lever and one end of said rod so that when the head moves in one direction, the drag of the rod will lift the clapper and remove the tool from cutting position and when it moves in the opposite direction the drag of the rod will lower the clapper and place the tool in cutting position irrespective of the angular position of the clapper box.

3. In a machine tool having a tool carrying clapper box mounted on a reciprocating head, a tool lifter comprising a lever mounted on the clapper and tiltable in a parallel plane therewith, a rod reciprocating with the head, a journal in which said rod is frictionally slidable mounted on a stationary portion of the machine, a rocker arm pivotally mounted on the head above the clapper box with its ends connected to said lever and one end of said rod so that when the head moves in one direction, the drag of the rod will lift the clapper and remove the tool from cutting position and when it moves in the opposite direction the drag will lower the clapper and place the tool in cutting position irrespective of the angular position of the clapper box, said head being universally adjustable and the connection between the rocker arm and the drag rod being flexible.

4. In a machine tool having a tool carrying clapper box mounted on a reciprocating head, a tool lifter comprising a lever mounted on the clapper and tiltable in a parallel plane therewith, a rod reciprocating with the head, a journal in which said rod is frictionally slidable mounted on a stationary portion of the machine, a rocker arm pivotally mounted on the head above the clapper box with its ends connected to said lever and one end of said rod so that when the head moves in one direction, the drag of the rod will lift the clapper and remove the tool from cutting position and when it moves in the opposite direction the drag of the rod will lower the clapper and place the tool in cutting position irrespective of the angular position of the clapper box, said head being universally adjustable and the connection between the rocker arm and the drag rod being flexible, and a universal joint along the length of the drag rod.

5. In a machine tool having a tool carrying clapper box mounted on a reciprocating head, a tool lifter comprising a lever mounted on the clapper and tiltable in a parallel plane therewith, a rod reciprocating with the head, a journal in which said rod is frictionally slidable mounted on a stationary portion of the machine, a rocker arm pivotally mounted on the head above the clapper box with its ends connected to said lever and one end of said rod so that when the head moves in one direction, the drag of the rod will lift the clapper and remove the tool from cutting position and when it moves in the opposite direction the drag of the rod will lower the clapper and place the tool in cutting position irrespective of the angular position of the clapper box, said journal being adjustable as to its frictional engagement with said rod.

6. In a machine tool having a tool carrying clapper box mounted on a reciprocating head, a tool lifter comprising a lever mounted on the clapper and tiltable in a parallel plane therewith, a rod reciprocating with the head, a journal in which said rod is frictionally slidable mounted on a stationary portion of the machine, a rocker arm pivotally mounted on the head above the clapper box with its ends connected to said lever and one end of said rod so that when the head moves in one direction, the drag of the rod will lift the clapper and remove the tool from cutting position and when it moves in the opposite direction the drag of the rod will lower the clapper and place the tool in cutting position irrespective of the angular position of the clapper box, the connection between said lever and said rocker arm being manually breakable.

WILLIAM F. RAFFKE.

REFERENCES CITED

The following references are of record in the file of this patent:

UNITED STATES PATENTS

| Number | Name | Date |
|--------|------|------|
| 634,540 | Prior | Oct. 10, 1899 |
| 1,775,963 | McCarroll | Sept. 16, 1930 |
| 2,090,507 | Zimmermann | Aug. 17, 1937 |
| 2,413,299 | Ducker | Dec. 31, 1946 |